United States Patent Office 2,995,772
Patented Aug. 15, 1961

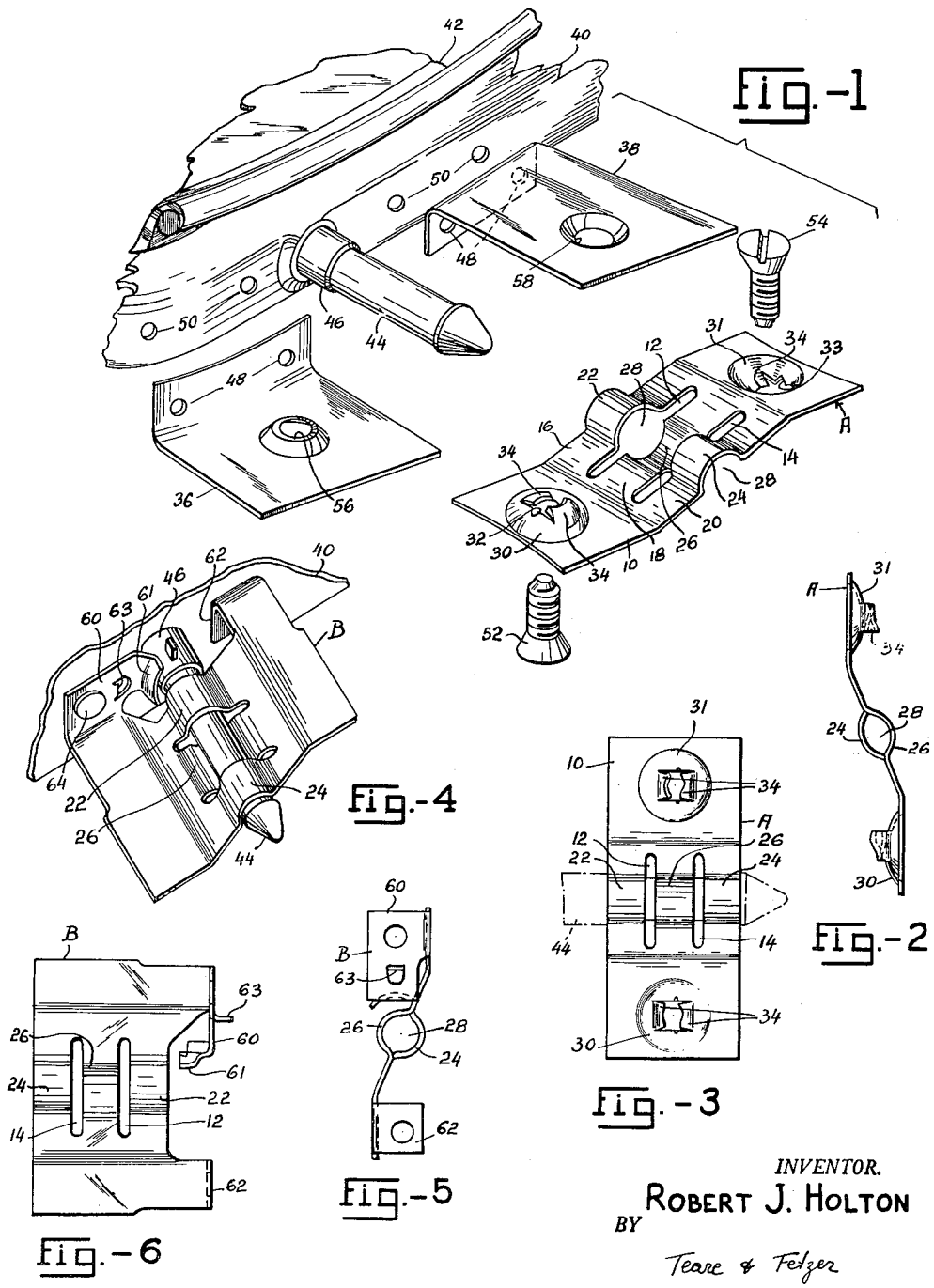

2,995,772
FASTENING DEVICE
Robert J. Holton, Cleveland, Ohio, assignor to Tinnerman Products, Inc., Cleveland, Ohio, a corporation of Ohio
Original application Feb. 25, 1957, Ser. No. 642,098, now Patent No. 2,949,627, dated Aug. 23, 1960. Divided and this application Feb. 17, 1960, Ser. No. 9,233
6 Claims. (Cl. 16—140)

This invention relates to fastening devices for rotatably retaining a shaft or the like, and more particularly to fastening devices for securing the swivel post of a car window vent frame. This application is a division of the pending United States patent application of Robert J. Holton, Serial No. 642,098, filed February 25, 1957, and now Patent No. 2,949,627, issued August 23, 1960.

Most types of car window vents are rotatably secured in position in the car door frame by means of hinge-type, friction fastening devices in which oppositely disposed swivel posts on the window vent frame are rotatably secured. Most fastening devices of this type consist of a number of individual parts, are complicated in design and require considerable time on the part of a skilled mechanic to assemble the same.

An object of the present invention is to provide a fastening device for rotatably mounting a car window vent that is simple in construction, contains a minimum number of parts, and which may be quickly and easily installed in position.

Briefly, the foregoing object is accomplished by the provision of a fastening device for rotatably mounting a car door window vent frame or the like comprising, a substantially flat, metallic rectangular strip having a resilient shaft-receiving socket therein. Initially, the strip may be lanced to form two parallel, longitudinal slots therein, thus dividing the strip into three parallel straps. The center strap formed by the lancing may then be drawn in one direction sideways and shaped to form a semi-cylindrical projection. The straps on both sides of the center strap may then be pressed in an opposite direction to form semi-cylindrical projections which, with the semi-cylindrical projection of the center strap, form a resilient socket, the axis of which is substantially parallel to the plane of the strip and is formed transversely thereof. The strip thus formed may be mounted on a car door frame by separate mounting brackets or the strip may be constructed with mounting brackets formed integral therewith. In either case, the brackets may be secured to the car door by any suitable means such as bolts, rivets, or the like.

With such a fastening device, there is provided a simple and efficient means whereby a car window vent frame may be quickly and simply mounted on a car door frame.

Other objects and advantages of the invention will be apparent from the following description taken in conjunction with the drawings in which:

FIG. 1 is a perspective, exploded view of a car door window vent mounting assembly including a fastening device constructed in accordance with the invention and showing the relative position of the parts thereof prior to assembly;

FIG. 2 is a side elevational view of the fastening device shown in FIG. 1;

FIG. 3 is a bottom view of the fastening device shown in FIG. 1. This view also shows in dot-dash lines the window vent frame swivel post in mounted position within the fastening device socket;

FIG. 4 is a perspective view of an application using a modified form of the fastening device shown in FIG. 1;

FIG. 5 is a side elevational view of the fastening device shown in FIG. 4;

FIG. 6 is a top plan view of the fastening device shown in FIG. 4.

Although the fastening device is described herein with reference to rotatably mounting a car door vent window frame in position on a car door, the device may be used wherever a shaft or like structure is to be rotatably mounted.

Referring to the embodiment shown in FIGS. 1 through 3, there is shown a fastening device A in the form of a partially flattened, rectangular strip or clip 10. Disposed substantially centrally on strip 10 are two parallel slots 12 and 14, formed substantially parallel with the longitudinal axis of the strip. The slots divide the central portion of the strip into three substantially similar parallel rectangular sections or straps 16, 18 and 20. The straps 16 and 20 are pressed sideways in one direction to form the semi-cylindrical projections 22 and 24, respectively, while the middle section or strap 18 is pressed in a similar manner in the opposite direction, thus forming the semi-cylindrical projection 26. The projections 22 and 24 coact with the projection 26 to form a cylindrical socket 28, the axis of which is substantially parallel to the plane of the clip 10, said socket being adapted to rotatably receive a shaft or the like therein.

Disposed near each end of the clip 10 are the dish-shaped indentations or concavities 30 and 31 having the stud or screw receiving openings 32 and 33 respectively disposed substantially centrally therein. Each opening is substantially defined by the space between the pair of spaced tongues 34, which are partially severed from the respective indentation and are bent outwardly out of the plane of the indentation. The tongues 34 are disposed at diametrically opposite sides of the opening and preferably are curved to correspond with the contour of a bolt or screw 52, 54 in a manner to engage the thread convolutions thereon in a friction tight fit. To further rigidify the mounting of the device A on the mounting brackets 36 and 38, the concavity 30 is indented in a direction opposite to that of the concavity 31.

A typical application of the fastening device A is illustrated in FIG. 1, wherein there is shown a car door frame 40 in which is rotatably supported a window vent frame 42. The window vent 42 has a shaft or swivel post 44 secured thereto and extending downwardly therefrom, said shaft being mounted in the car door frame sleeve 46. A similar swivel post (not shown) may be secured also to the top of the window vent. The mounting brackets 36 and 38 may be secured to the car door frame 40 by any suitable means, as for example by means of rivets or screws, which are inserted in the opposed co-acting openings 48 and 50 in the brackets and the frame respectively. Next the fastening device A is secured to the swivel post 44 by inserting the swivel post into the cylindrical socket 28 formed in the fastening device A between the projections 22, 24 and 26 therein. Finally, the fastening device A is secured to the brackets 36 and 38 by the screws 52 and 54, which are inserted in the opposed complementary openings 56 and 32, and 58 and 33 in the brackets and the fastening device A respectively. The hinged joint formed by the co-action of the shaft 44 with the socket 28 is a tight frictional joint. Accordingly, rotation of the window vent is somewhat restrained, thereby permitting the window vent to be substantially held in place no matter what angular position the window vent may be placed in.

A modification of the fastening device aforedescribed is shown in FIGS. 4, 5 and 6 wherein like parts are identified by like number. In FIG. 4, the fastening device B has the mounting brackets 60 and 62 formed integral therewith. The device B may be secured to the car door frame 40 by any suitable means, as, for example, the stud 64. Formed integral with the mounting bracket 60 is a guide and strengthening member 61 for aligning the device B with the sleeve 46 and for rigidifying the installation. An aligning projection 63 may be struck from the base of the bracket 60 and is adapted for insertion into an oppositely disposed opening (not shown) in the frame 40 to align the device B with the frame when the device is installed thereon. In other respects the fastening device B is substantially similar to the fastening device A described above.

Although the invention has been described in connection with a car door vent window, it will be understood that the invention may be used wherever a shaft or the like is to be rotatably mounted in a manner allowing the shaft to be firmly held in place no matter what angular position said shaft may be placed with respect to the fastening device.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

I claim:

1. A fastening device for rotatably retaining a swivel shaft mounted on a support comprising, a substantially flat sheet metal clip having a generally longitudinally disposed back marginal boundary and a front marginal boundary, said clip having at least two parallel slots formed longitudinally thereof inwardly of all marginal edges of the clip and dividing the clip into parallel longitudinally extending sections, the middle portion of one of said sections being deformed outwardly generally transverse of the respective section and in a direction at substantially a right angle to the plane of the clip to form a substantially semi-cylindrical projection, and the other of said sections being deformed outwardly in a like manner in the opposite direction to the plane of said clip to form semi-cylindrical projections, said projections forming a socket extending transverse of the clip and from said back marginal boundary for receiving in frictional rotatable relation the swivel shaft, and mounting brackets at each end of the clip adjacent said back marginal boundary for attaching the clip to a support, each of said brackets including a support engaging portion, the support engaging portions of said brackets being disposed on opposite sides of said socket and in planes extending generally transverse to the lengthwise axis of said socket.

2. A fastening device in accordance with claim 1, wherein said brackets are detachable from said clip, said clip having an aperture adjacent each end thereof, receiving in threaded relation fastener means for attaching the clips to the brackets.

3. In combination, a support, a swivel shaft rotatably mounted on said support, and a fastening device for embracing and supporting said swivel shaft in frictional rotatable relation therewith, said shaft comprising a rounded pilot portion at the leading end thereof and a reduced diameter size section adjacent said pilot portion, said fastening device comprising a substantially flat sheet metal clip having a generally longitudinally disposed back marginal boundary and a front marginal boundary, said clip having two parallel slots formed longitudinally thereof inwardly of all marginal edges of the clip and dividing the clip into three parallel and longitudinally extending sections, the middle one of said sections being deformed outwardly generally transverse of the respective section and in a direction at substantially a right angle to the plane of the clip to form a substantially semi-cylindrical projection, and the other of said sections being deformed outwardly in a like manner in the opposite direction to the plane of said clip to form semi-cylindrical projections, said projections forming a socket extending transversely of the clip and from said back marginal boundary to said front marginal boundary, said socket receiving said reduced size section of said shaft therein in frictional rotatable relation with said pilot portion of said shaft guiding the latter through said socket whereby said pilot portion is disposed outwardly of said front marginal boundary of said clip, and mounting brackets on each end of said clip adjacent said back marginal boundary, said brackets including support engaging portions disposed on opposite sides of said socket and in planes extending generally transverse to the lengthwise axis of said socket, and fastener means coacting between said brackets and said support for mounting said clip in predetermined position on said support, said pilot portion coacting with said front marginal boundary of said clip to aid in preventing axial movement of said shaft in one direction with respect to said clip.

4. The combination in accordance with claim 3 wherein said brackets are detachable from said clip, and including threaded means detachably connecting said brackets to said clip.

5. A fastening device for rotatably retaining a swivel shaft mounted on a support comprising, a substantially flat sheet metal clip having a generally longitudinally disposed back marginal boundary and a front marginal boundary, said clip having at least two parallel slots formed longitudinally thereof inwardly of all marginal edges of the clip and dividing the clip into parallel longitudinally extending sections, one of such sections being deformed outwardly generally transverse of the respective section and in a direction at substantially a right angle to the plane of the clip to form a substantially semi-cylindrical projection, and the other of said sections being deformed outwardly in a like manner in the opposite direction to the plane of said clip to form semi-cylindrical projections, said projections forming a socket extending transverse of the clip and from said back marginal boundary, for receiving in frictional rotatable relation the swivel shaft, mounting brackets at each end of the clip adjacent said back marginal boundary for attaching the clip to a support, each of said brackets including a support engaging portion, the support engaging portions of said brackets being disposed on opposite sides of said socket and in planes extending generally transverse to the lengthwise axis of said socket, and at least one of said brackets comprising an arcuate-shaped guide portion adapted for guiding engagement with the swivel shaft.

6. A fastening device in accordance with claim 5 wherein one of said brackets comprises a locating tongue struck from a partially severed portion of said support engaging portion of the respective bracket and adapted for reception in a complementary opening in a support for aiding in locating said clip in predetermined position on the support.

References Cited in the file of this patent

UNITED STATES PATENTS

| | | |
|---|---|---|
| 383,468 | Jones et al. | May 29, 1888 |
| 1,394,317 | Loutrel | Oct. 18, 1921 |
| 1,526,546 | Holm | Feb. 17, 1925 |
| 2,260,403 | Preston | Oct. 28, 1941 |